United States Patent [19]

Takahashi et al.

[11] 4,361,605
[45] Nov. 30, 1982

[54] APPARATUS USED IN SURFACE TREATMENT AND A METHOD OF SURFACE TREATMENT USING SAID APPARATUS

[75] Inventors: Yoshinobu Takahashi; Yasuo Tokushima; Kentarou Ogata, all of Toyota; Mamoru Suzuki, Aichi; Zyouzi Ito, Toyota, all of Japan

[73] Assignee: Toyota Jidosha Kabushiki Kaisha, Aichi, Japan

[21] Appl. No.: 262,429

[22] Filed: May 11, 1981

[30] Foreign Application Priority Data

May 12, 1980 [JP] Japan .................. 55-063268

[51] Int. Cl.³ .............................. C23F 7/08
[52] U.S. Cl. ............................ 427/424; 148/6.15 R; 148/6.15 Z; 118/422; 118/423; 118/429; 118/603; 427/434.5
[58] Field of Search ............... 118/422, 423, 429, 603; 427/434.5, 424; 148/6.15 R, 6.15 Z

[56] References Cited

U.S. PATENT DOCUMENTS

| 2,050,830 | 8/1936 | Delany | 118/423 X |
| 3,539,381 | 11/1970 | Kayarian | 427/424 |
| 4,196,023 | 4/1980 | Rowe | 148/6.15 R |
| 4,287,004 | 9/1981 | Murakami et al. | 148/6.15 R |

*Primary Examiner*—Shrive P. Beck
*Attorney, Agent, or Firm*—Oblon, Fisher, Spivak, McClelland & Maier

[57] ABSTRACT

An apparatus used in surface treatment and a method of surface treatment using said apparatus are provided in the present invention.

Said apparatus comprises a dipping tank forming one or more hoppers in its bottom, a drain path connected to said hoppers, a solid-liquid separator settled in said drain path, a recirculating path for supernatant from said separator, and a spraying tool connected to said recirculating path and arranged in the rear part of the dipping tank; and said method of surface treatment using said apparatus comprises dipping an article-to-be-treated in a treating liquid in a dipping tank forming one or more hoppers in its bottom, purging sludge formed and settling during said dipping through a drain path connected to said hoppers, separating said sludge by a solid-liquid separator settled in said drain path, recirculating supernatant through a recirculating path from said separator to a spraying tool connected to said recirculating path and arranged in the rear part of dipping tank, and spraying said supernatant from said spraying tool to the treated surface of an article after dipping.

7 Claims, 1 Drawing Figure

APPARATUS USED IN SURFACE TREATMENT AND A METHOD OF SURFACE TREATMENT USING SAID APPARATUS

BACKGROUND OF THE INVENTION

1. Field of the Invention

The present invention relates a new apparatus used in surface treatment. Further, the instant invention relates a new method of surface treatment using said apparatus. Surface treatment in the instant invention may include the anticorrosive treatment, plating, etching and the like.

More particularly, the present invention relates a new apparatus used in surface treatment and a new method of surface treatment, in which sludge formed during surface treatment is continuously purged from a treating liquid.

2. Description of the Prior Art

The surface treatment comprises making a treating liquid contact a surface-to-be-treated.

Hitherto two methods have been used for making a treating liquid contact a surface-to-be-treated. One of them comprises spraying the treating liquid on the surface-to-be-treated and the other comprises dipping the surface-to-be-treated in the treating liquid. In the spraying method, the treating liquid is difficult to contact perfectly with the surface-to-be-treated which has complicated shapes such as parts, a body and the like of a car and especially the treating liquid is very difficult to contact with the inner faces of a box-shaped article such as a fender, a door, a member and the like, so untreated parts remaining after the surface treatment cannot be avoided. In the dipping method, treating liquid is easier to contact perfectly with the surface-to-be-treated than in the spraying method, since treating liquid can easily enter the inside of the box-shaped articles to contact their inner faces and few untreated parts remain after the surface treatment, but sludge is formed during dipping the surface-to-be-treated in the treating liquid, and said sludge settles in the dipping tank to obstruct the smooth and continuous surface treatment.

SUMMARY OF THE INVENTION

Accordingly, an object of the present invention is to purge the sludge continuously from the treating liquid. Another object of the present invention is to provide a smooth and continuous surface treatment by purging the sludge continuously from the treating liquid. Further object of the present invention is to wash off the sludge from the treated surface and cool the treated surface by withdrawing the heat by spraying treating liquid separated from the sludge.

Briefly, these objects of the present invention can be attained by a new apparatus which comprises a dipping tank forming one or more hoppers in its bottom, a drain path connected to said hoppers, a solid-liquid separator settled in said drain path, a recirculating path for supernatant from said separator, and a spraying tool connected to said recirculating path and arranged in the rear part of the dipping tank, and a new method which comprises dipping surfaces-to-be-treated of an article in a treating liquid in a dipping tank forming one or more hoppers in its bottom, purging sludge formed and settling during said dipping through a drain path connected to said hoppers, separating said sludge by a solid-liquid separator settled in said drain path, recirculating supernatant through a recirculating path from said separator to a spraying tool connected to said recirculating path and arranged in rear part of the dipping tank, and spraying said supernatant from said spraying tool to the treated surface after dipping.

BRIEF DESCRIPTION OF THE DRAWING

The FIGURE is a schematic diagram of the preferred embodiment of a surface treatment system according to the present invention.

DETAILED DESCRIPTION OF THE PREFERRED EMBODIMENT

Figure 1:
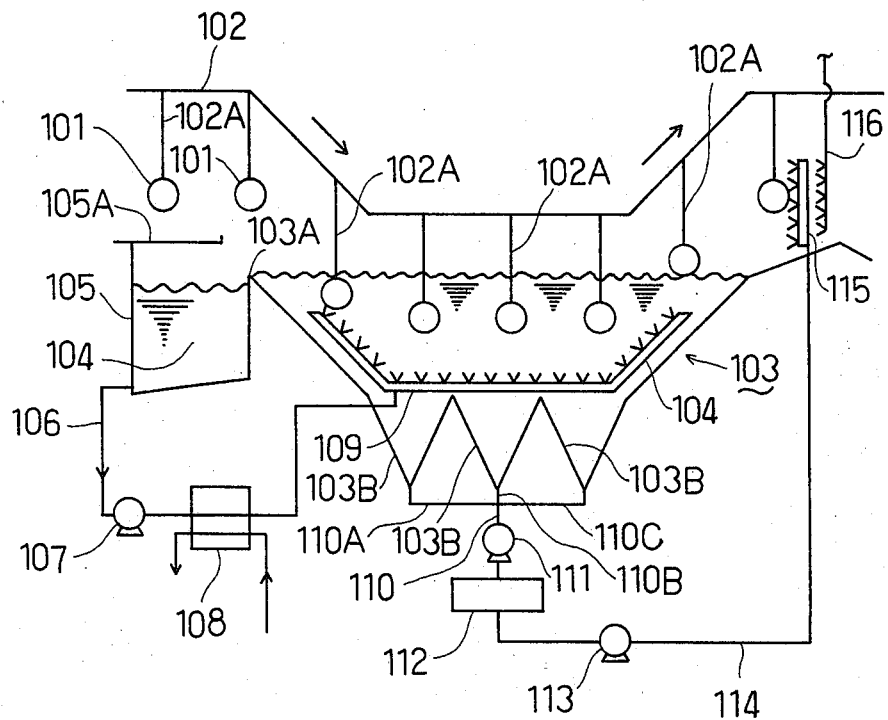

A preferred embodiment provided herein relates the zinc-phosphating as a pre-treatment of painting of a car body and the like.

Referring now to FIG. 1, 103 is a dipping tank forming three hoppers 103B in its bottom. A means of overflow 103A is formed in the front side of said dipping tank 103 and a container 105 is arranged in contact with said means of overflow 103A. A shelter 105A is positioned over said container 105. A bottom riser 109 is laid on the bottom of the dipping tank 103 and a conveyer 102 having a large number of suspenders 102A is positioned over the dipping tank 103. Further, two spraying risers 115 and 116 are arranged by the rear end of the dipping tank 103. The container 105 is connected to said bottom riser 109 by a recirculating path 106. A pump 107 and a heat exchanger 108 are settled in said recirculating path 106. One end of a drain path 110 is connected to each hopper 103B by three branch paths 110A, 110B and 110C, and a pump 111 is settled in said drain path 110. The other end of the drain path 110 is connected to a solid-liquid separator 112 and one end of a recirculating path 114 is connected to said separator. A pump 113 is settled in said recirculating path 114 and the other end of the recirculating path is connected to said spraying riser 115.

In the above mentioned apparatus, the following zinc-phosphating is carried out.

Surfaces-to-be-treated of articles are first treated with trichloroethylene or alkali solution or the like to remove oil from said surfaces-to-be-treated of said articles, and then washed by water and usually treated with titanium-phosphate solution to form a seed of a film of titanium-phosphate crystal on the surfaces-to-be-treated. After said pre-treatment, said articles-to-be-treated are respectively hung on the suspenders 102A of the conveyer 102 moving in the direction shown by an arrow in FIG. 1, and are dipped into zinc-phosphate solution as a treating liquid in the front part of the dipping tank 103.

The articles 101 dipped into said treating liquid in the front part of the dipping tank 103 move in the direction of the rear part of the dipping tank 103 according to the movement of the conveyer 102 and while moving, zinc-phosphate crystal grows to cover whole surfaces-to-be-treated of the articles 101. It usually takes about 60 to 300 sec. to cover the grown zinc-phosphate crystal on the whole surface-to-be-treated. While the articles 101 are dipped in the treating liquid, the treating liquid in the dipping tank 103 is overflowed from the means of overflow 103A to be received and kept in the container 105. The mist and/or vapour of the treating liquid 104 in the container 105 is prevented from contacting with the articles 101 by the shelter 106A, otherwise a bluish ironphosphate layer is formed on the surface-to-be-treated by contacting with said mist and/or vapour.

The treating liquid 104 kept in the container 105 is recirculated to the bottom riser 109 through the recirculating path 106 by the pump 107. The treating liquid 104 is heat-exchanged by said heat exchanger 108 and heated at a desired temperature. Thus a flow in the reverse direction against the movement of the articles 101 is given to the treating liquid 104 in the dipping tank 103 in the above mentioned recirculating of the treating liquid 104. Said flow gives a uniform contact between the treating liquid 104 and the surface-to-be-treated of the articles 101.

During the above mentioned zinc-phosphating, sludge is formed in the treating liquid 104 in the dipping tank 103 and settles in the under part of each hopper 103B. Settling effect of said sludge may be increased by the shape of the hopper 103B. The sludge in the under part of hopper 103B is purged to the drain path 110 through each branch path 110A, 110B and 110C by head pressure and/or the pump 111 when the sludge settles to be a fixed amount in each hopper 103B and then separated by the solid-liquid separator. Separated liquid is recirculated to the spraying riser 115 through the recirculating path 114 by the pump 113 and sprayed to the treated surface of the article 101.

Before the separated liquid is sprayed to the treated surface, the article 101 is refloated from the treating liquid 104 in the dipping tank 103 and the sludge on the treated surface is washed off by said spraying. Simultaneously, the treated surface is cooled by heat-exchange with spraying the separated liquid and thus heat of the treated surface is withdrawn. Moreover the treated surface is washed by water sprayed from the spraying riser 116 to remove the remaining sludge on the treated surface, and further to cool the treated surface still further to withdraw heat of the treated surface and to prevent drying.

As will be obvious to one skilled in the art many modifications, variations, and alterations can be made in the practices of this invention without departing from the spirit and scope thereof as set forth in the claims which follow.

What is claimed as new and desired to be secured by Letters Patent of the United States is:

1. An apparatus comprising:
   a dipping tank having a first end, a second end and a bottom, said tank being adapted to be filled with a liquid;
   means for moving an article from said first end to said second end while said article is immersed in said liquid;
   at least two hoppers comprising the entire bottom of said dipping tank;
   first spray means adjacent said second end for spraying each said article as said article leaves said dipping tank;
   first conduit means connected only between all of said hoppers and said first spray means;
   filter means in said first conduit means whereby all of said fluid is filtered between said hoppers and said first spray means; and
   means for circulating liquid through said first conduit means whereby said liquid is circulated from said hoppers through said first circulating means to said first spray means.

2. The apparatus in accordance with claim 1, wherein said means for moving comprises a conveyer having a large number of suspenders arranged over said dipping tank.

3. The apparatus of claim 1 including:
   second spray means adjacent said bottom of said tank;
   an overflow tank adjacent said first end of said dipping tank for receiving overflow liquid from said dipping tank;
   second conduit means connected only between said overflow tank and said second spray means;
   heating means in said second conduit whereby all of said fluid in said second conduit is heated; and
   means for circulating liquid through said second conduit means whereby said liquid is circulated from said dipping tank to said overflow tank and through said second conduit means to said second spray means.

4. A method of surface treating articles, comprising:
   moving said articles through a liquid in a dipping tank, from a first end of said tank to a second end of said tank;
   collecting sludge in at least two hoppers comprising the entire bottom of said dipping tank;
   draining said sludge in a drain path;
   separating the liquid and solid of said sludge in a liquid solid separator connected in said drain path; and
   circulating all of said separated liquid directly through a conduit means connected only between all of said hoppers and a first spray tool at said second end of said dipping tank for rinsing said sludge from said articles.

5. The method of claim 4, wherein said liquid in said dipping tank flows in the reverse direction against said movement of said article.

6. The method of claim 4 including the steps of:
   spraying said liquid in said dipping tank from a second spray tool adjacent said bottom of said dipping tank;
   draining overflow liquid from said dipping tank into an overflow tank adjacent said first end of said dipping tank;
   circulating all of said overflow liquid from said overflow tank to said second spray tool; and
   heating all of said overflow liquid circulating to said second spray tool.

7. The method of claim 6, wherein a means of overflow is formed in said first side of said dipping tank and said liquid overflows from said means of overflow.

* * * * *